United States Patent
Yuan et al.

(10) Patent No.: US 10,178,486 B2
(45) Date of Patent: Jan. 8, 2019

(54) ACOUSTIC FEEDBACK CANCELLER

(71) Applicants: CREATIVE TECHNOLOGY LTD, Singapore (SG); Steve Verity, Santa Clara, CA (US)

(72) Inventors: River Yuan, San Jose, CA (US); Steve Verity, Santa Clara, CA (US); Ian Minett, San Jose, CA (US); Robert Ridder, Santa Cruz, CA (US)

(73) Assignee: Creative Technology Ltd, Singapore (SG)

( * ) Notice: Subject to any disclaimer, the term of this patent is extended or adjusted under 35 U.S.C. 154(b) by 0 days.

(21) Appl. No.: 14/899,466

(22) PCT Filed: Jun. 19, 2014

(86) PCT No.: PCT/US2014/043297
§ 371 (c)(1),
(2) Date: Dec. 17, 2015

(87) PCT Pub. No.: WO2014/205297
PCT Pub. Date: Dec. 24, 2014

(65) Prior Publication Data
US 2016/0157037 A1    Jun. 2, 2016

Related U.S. Application Data

(60) Provisional application No. 61/837,155, filed on Jun. 19, 2013.

(51) Int. Cl.
*H04R 3/02* (2006.01)
*H04B 15/00* (2006.01)
*H04R 29/00* (2006.01)
*H04B 1/715* (2011.01)
*H04W 40/12* (2009.01)
*G10L 19/02* (2013.01)
*H04M 9/08* (2006.01)

(52) U.S. Cl.
CPC ........ *H04R 29/007* (2013.01); *G10L 19/0212* (2013.01); *H04B 1/715* (2013.01); *H04M 9/082* (2013.01); *H04R 3/02* (2013.01); *H04W 40/12* (2013.01); *H04R 2227/001* (2013.01); *H04R 2410/07* (2013.01)

(58) Field of Classification Search
CPC ........ H04R 3/02; H04R 29/001; H04M 9/082
USPC .......................................... 381/83, 93, 95, 96
See application file for complete search history.

(56) References Cited

U.S. PATENT DOCUMENTS

| 5,442,712 A | * | 8/1995 | Kawamura | ............... H04R 3/02 381/83 |
| 5,677,987 A | | 10/1997 | Seki et al. | |

(Continued)

FOREIGN PATENT DOCUMENTS

| EP | 0599450 A2 | 6/1994 |
| WO | 02/21817 A2 | 3/2002 |
| WO | 2011/154808 A2 | 12/2011 |

*Primary Examiner* — George C Monikang
(74) *Attorney, Agent, or Firm* — Russell Swerdon; Desmund Gean

(57) ABSTRACT

In embodiments of this invention howling sounds are removed without disturbing speech and music. Microphone signals are converted to the frequency domain where howling frequencies are detected and estimated using howling to noise ratios. A notch filter adaptively designed for the howling frequency is applied to remove the howling.

19 Claims, 3 Drawing Sheets

(56) References Cited

U.S. PATENT DOCUMENTS

| | | | | |
|---|---|---|---|---|
| 2003/0012388 A1* | 1/2003 | Ura | ............................ | H04R 3/02 |
| | | | | 381/66 |
| 2007/0104335 A1* | 5/2007 | Shi | ............................ | H04R 3/02 |
| | | | | 381/93 |
| 2007/0121928 A1* | 5/2007 | Beaucoup | ............. | H04M 9/082 |
| | | | | 379/406.08 |
| 2008/0195392 A1* | 8/2008 | Iser | ........................ | G10L 21/038 |
| | | | | 704/265 |
| 2010/0027820 A1* | 2/2010 | Kates | ...................... | G10L 25/00 |
| | | | | 381/312 |

* cited by examiner

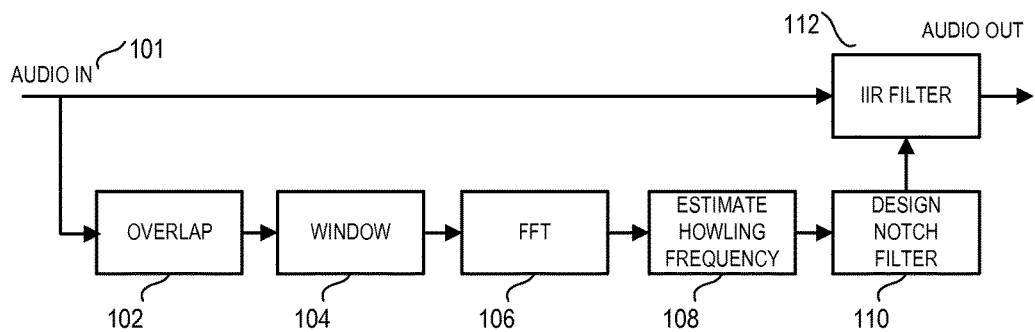
*Fig._1*
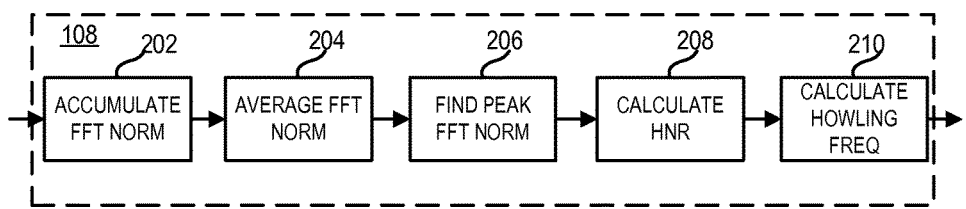
*Fig._2*

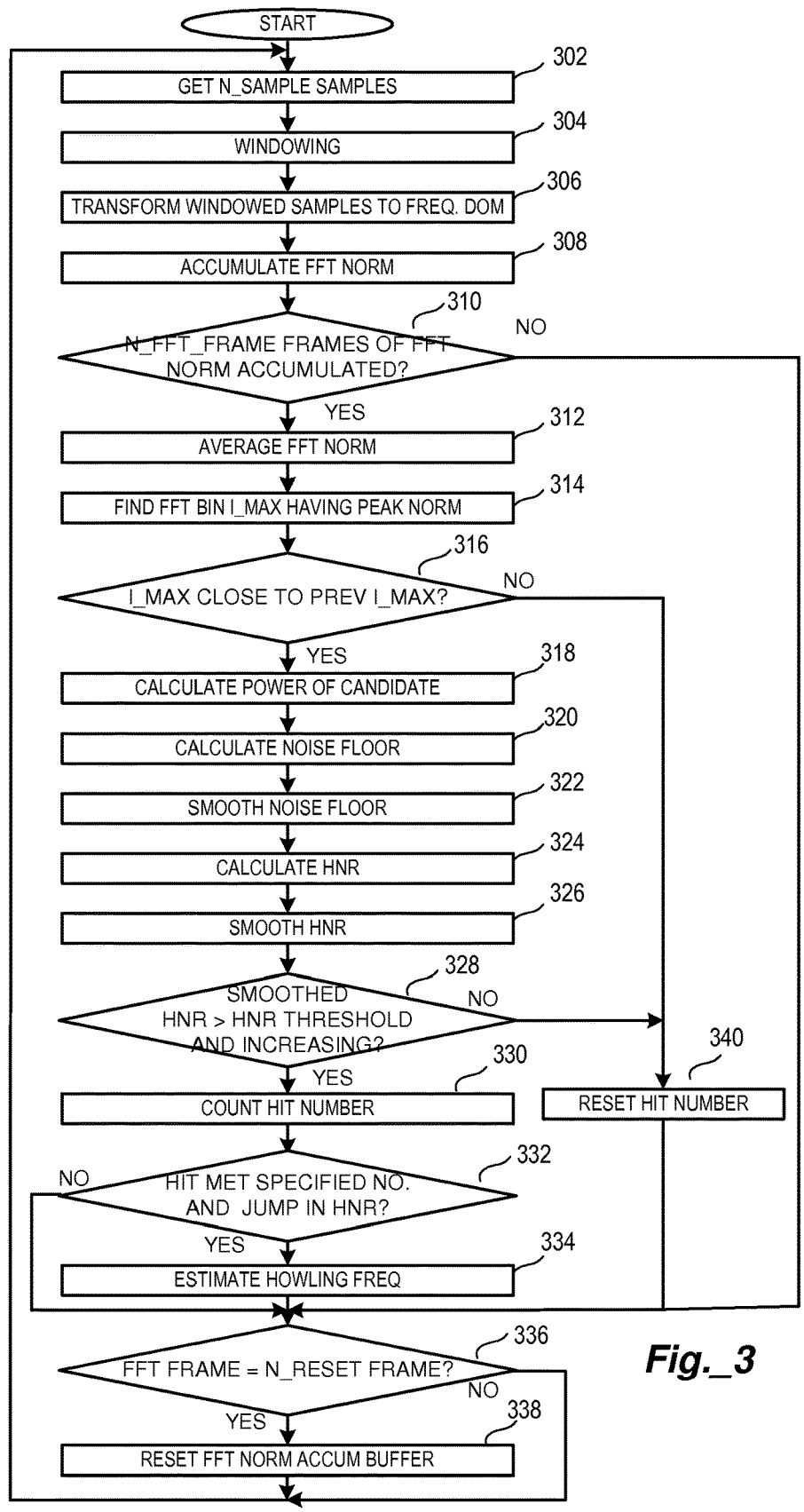
Fig._3

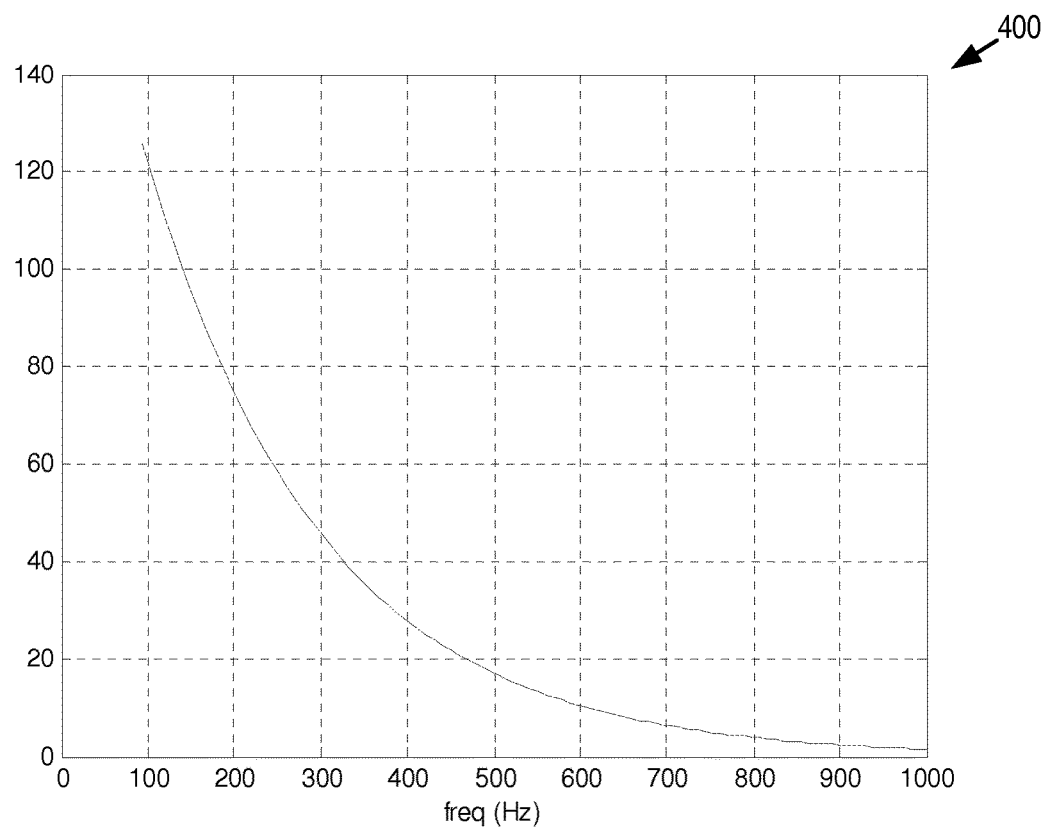
*Fig._4*

ACOUSTIC FEEDBACK CANCELLER

CROSS REFERENCE TO RELATED APPLICATIONS

This application claims priority from U.S. Provisional Application No. 61/837,155 filed on Jun. 19, 2013 which is hereby incorporated by reference in its entirety.

BACKGROUND OF THE INVENTION

Field of the Invention

The present invention relates in one embodiment to controlling acoustic howling feedback in audio signals.

Description of the Related Art

In the public addressing (PA) or other audio systems, an annoying howling sound will be produced if the gain between the speaker(s) and microphone(s) is larger than one and they are in phase. Traditionally, such howling can be removed by manually repositioning the microphone and/or speaker. Alternatively, the howling can be eliminated by adjusting the gain in different audio bands using an EQ filter. However, such methods are not convenient and/or are impractical in some situations. For example, if the position of microphone and speaker is fixed and/or an EQ filter is not available, the above methods cannot be employed. Although there are several prior art descriptions regarding the elimination of the howling digitally, such prior art descriptions are flawed in one or more of the following ways: howling frequency cannot be estimated accurately, especially using limited number points of fast Fourier transform (FFT) and thus the howling is not removed efficiently and reliably; tonal music signals are prone to be removed wrongly; processed signals are distorted; or processed signals are too complicated to be implemented in embedded system and thus consume more memory or MIPs than desired. What is needed is an improved system and method for handling howling sounds.

SUMMARY OF THE INVENTION

To achieve the foregoing, the present invention provides proposes an efficient, reliable, robust yet simple method to remove the howling quickly.

According to one embodiment, the incoming time domain audio signals from the microphone are transformed into frequency domain by a Fast Fourier Transform (FFT). The magnitudes or norms of the FFT bins are accumulated and then averaged. The FFT bins that have maximum magnitude are howling frequency candidates.

Howling is detected based on howling to noise ratio (HNR). If the HNR at the candidate howling frequency is larger than a threshold and is increasing in N (5 in a preferred embodiment of this invention) consecutive runs and at least one of these N consecutive runs is larger than a threshold, the howling is detected. The magnitudes at the peak FFT bin and one immediately before and one immediately after this peak FFT bin are used to estimate the howling frequency. That is, the bin immediately lower in frequency and the bin immediately higher in frequency are also used in the estimate of the howling frequency. Compared to the conventional FFT of the same FFT points, the frequency estimation precision is improved significantly by the new method. For example, the howling frequency estimation error using a 1024-point FFT here can be as low as +/−1 Hz, which is equivalent to the frequency estimation error by an 8192-point FFT using conventional methods. As soon as a howling is detected and howling frequency is estimated a notch filter with the howling frequency as the center frequency is inserted in the audio path, thus removing the howling. The proposed method has been successfully implemented in speaker systems.

These and other features and advantages of the present invention are described below with reference to the drawings.

BRIEF DESCRIPTION OF THE DRAWINGS

FIG. 1 is a block diagram illustrating a notch filter howling cancellation system in accordance with various embodiments of the present invention.

FIG. 2 is a block diagram illustrating in further detail the howling frequency estimation block of FIG. 1, in accordance with various embodiments of the present invention.

FIG. 3 is a flowchart illustrating a howling detection and howling frequency estimation method according to various embodiments of the present invention.

FIG. 4 is a plot illustrating an adjusting curve of a howling detection threshold in accordance with various embodiments of the present invention.

DETAILED DESCRIPTION OF PREFERRED EMBODIMENTS

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Embodiments of this invention provide an efficient, reliable, robust yet simple method to remove the howling sound quickly. FIG. 1 shows the diagram of a notch filter howling cancellation system in accordance with one embodiment of the invention. Preferably, time domain microphone signals are windowed, overlapped and are transformed into frequency domain data by an N_FFT (1024 in a preferred embodiment of this invention) point PET. Howling frequencies are then detected and estimated in the frequency domain. As soon as the howling frequency is found, a notch filter with the howling frequency as the center frequency is designed on-the-fly. The notch filter is then inserted in the audio path, and thus the howling is removed in the time domain. Further details as to FIG. 1 are provided as follows. The audio input signal 101 is first processed by an overlap operation in block 102. The amount of the overlap can vary (the common overlap is 25%, 50% and 75% or the hop size is 75%, 50% and 25% respectively) but in a preferred embodiment the overlap is 75% or hop size is 25%. Next, in block 104, the overlapped samples are windowed. Various windowing methods are known in the arts to process samples of a time domain signal and the present invention embodiments are not limited to any particular windowing method. Next in block 106 an FFT of the windowed data is performed to convert the time domain signals to frequency domains. In block 108 the howling is detected and the howling frequency is estimated. Using the estimated howling frequency, a notch filter is designed in real time in block 110 with the designed filter coefficients in IIR filter 112 to remove the howling from the audio in stream 101.

To accurately and reliably estimate the howling frequency in block 108, the FFT magnitudes or norms are accumulated and then averaged before finding the FFT bin I_MAX that has the peak magnitude. Power around the I_MAX and noise floor are estimated. Howling frequency is determined based on howling to noise ratio (HNR) (FIG. 2). FIG. 2 is a block diagram illustrating in further detail the howling detection and howling frequency estimation block 108 of FIG. 1, in accordance with various embodiments of the present invention. Initially the FFT norms are accumulated in accumulate FFT norm block 202. Next, in average FFT norm block 204, the FFT norms are averaged. The peak FFT norms are identified in find peak FFT norm block 206. In calculate HNR block 208, the Howling-to-Noise Ratio (HNR) is calculated, first by calculating the power of the candidate frequency and calculating the noise floor and preferably determining the HNR as the ratio of the howling power to the smoothed noise floor. The HNR is used to calculate the howling frequency in calculate howling frequency block 210. Further details as to the detection of the howling frequency are provided in the flowchart of FIG. 3.

FIG. 3 provides a flowchart for the proposed howling detection and howling frequency method implemented in a general purpose computer suitably programmed or a DSP processor (such as including but not limited to embedded processors) in accordance with preferred embodiments of the present invention. The howling detection and howling frequency estimation algorithm is frame based. In each frame, N_SAMPLE (256 in this invention embodiment) new samples or the hop size of N_SAMPLE new samples (step 302) of microphone signals are overlapped and windowed (step 304) with the N_FFT-N_SAMPLE (768 in this invention embodiment) old samples. Further, in this invention embodiment, a squared Hanning window is employed. The FFT is performed in step 306 to transform the overlapped and windowed samples to the frequency domain. The FFT magnitudes or norms are then accumulated in step 308. If insufficient number of frames are accumulated the flow process proceeds from decision tree 310 to the start to obtain further samples (step 302). Where sufficient frame number of the FFT norms have accumulated, the flow process continues. That is, in preferred embodiments, for each N_FFT_FRAME (3, 6, 9, 12, and 15 in this invention embodiment) frames, the accumulated FFT magnitudes are averaged in step 312. Next in step 314 we search for the FFT bin I_MAX that has the maximum magnitude in the averaged FFT magnitudes through whole frequency bins. The FFT bin I_MAX is taken as candidate howling frequency. That is, in decision tree step 316, if the distance between I_MAX and the previous I_MAX is smaller than a specified number FFT_HOWLING_DELTA (3 in a preferred embodiment of this invention), the power of the howling frequency around I_MAX and the noise floor are calculated in steps 318 and 320 respectively. Otherwise, the counter HIT is reset in step 340. The noise floor is smoothed by first order smoother in step 322 using Equation 1:

$$nflr(n+1)=(1-a)nflr(n)+aP_{noise} \quad \text{(Equation 1)}$$

The smooth factor $\alpha$ is taken as 0.01 in this invention embodiment but other factors could be used as well without departing from the spirit and concepts of the invention. The HNR is then calculated in step 324 as the ratio of howling power over the smoothed noise floor. In step 326 the HNR is also smoothed by a first order smoother, preferably by Equation 2:

$$hnr(n+1)=(1-\beta)*hnr(n)+\beta*nflr(n+1) \quad \text{(Equation 2)}$$

The smooth factor $\beta$ is taken as 0.3 in this preferred invention embodiment but other values could be used as well. In step 328, if the smoothed HNR is larger than the HNR threshold (30 in this preferred embodiment) and is increasing for each run, the counter HIT is increased by 1 in step 330. Otherwise, flow proceeds to reset the counter HIT (step 340).

The howling detection is based on the following criteria:
1. The smoothed HNR is larger than the HNR threshold HNR_THRD (30 in this invention embodiment). (See step 328)
2. The smoothed HNR is increasing for N_HIT (5 in this invention embodiment) consecutive runs. (See step 328)
3. In N_HIT (5 in this invention embodiment) consecutive runs (see step 332), there is at least one jump that is greater than HNR_JUMP_THRD (1.2 in this preferred invention embodiment).

The key to fast, accurate and reliable howling or acoustic feedback cancellation and without distorting audio signals is accurate estimate of the howling frequency. Usually the less the howling frequency estimate error is, the more efficient the howling or acoustic feedback cancellation is or the better the processed howling-free audio quality is. However, the limited FFT size restricts the smaller frequency estimate error that can be achieved. For example, the frequency estimate error of an 1024-point FFT in the sampling rate of 16 kHz can be as large as 8 Hz. If +/−1 z frequency estimate error is desired, at least an 8192-point FFT in the sampling rate of 16 kHz should be employed, which is too expensive and is impractical to implement in real products. In this invention, the howling frequency estimate error can be as small as +/−1 Hz by an 1024-point FFT in the sampling rate of 16 kHz. The howling frequency Fc (step 334) is calculated by the Equations 3~7:

$$l = 20\log_{10}(Y_-) \quad \text{(Equation 3)}$$

$$c = 20\log_{10}(Y) \quad \text{(Equation 4)}$$

$$r = 20\log_{10}(Y_+) \quad \text{(Equation 5)}$$

$$fc' = \frac{l-r}{2(l-2c+r)} \quad \text{(Equation 6)}$$

$$F_c = (I\_MAX + fc')\frac{F_s}{N\_FFT} \quad \text{(Equation 7)}$$

Y is the FFT norm at the FFT bin I_MAX, and $Y_-$ and $Y_+$ are the FFT norms immediately before and immediately after I_MAX, respectively.

The FFT norm accumulation buffer is reset for each N_RESET_FRAME (15 in this invention embodiment) frames (see steps 336 and 338.)

The howling detection threshold is adjusted in low frequency. FIG. 4 is the example of the howling detection adjusting curve, which can be implemented by the Equation 8:

$$\theta=200*1.08^{-f} \quad \text{(Equation 8)}$$

The proposed howling cancellation method has been successfully applied in the Creative Labs speaker products.

It quickly removes the howling sounds, but keeps both speech and music signals intact. The proposed howling frequency estimation method significantly improves the frequency estimation precision and thus greatly improves the processed howling-free audio quality. For example, the frequency estimation error for a 1024 point FFT is +/−1 Hz in the sampling rate of 16 kHz using the methods of the present invention which is the frequency estimation error of an 8192 point FFT by conventional methods.

The proposed howling cancellation method can be used in public address (PA) and any audio systems that have the microphone and speaker positioned in the same acoustic environment. The proposed method can also be used in smart phone, tablet, and telepresence systems.

Comparing the prior-art devices and methods, major unique features and advantages provided by embodiments of the invention included in preferred embodiments but are not limited to:

1. FFT norms are accumulated and averaged.
2. Howling detection is based on howling to noise ratio (HNR).
3. Both noise floor and HNR are smoothed by first order smoother.
4. Howling detection criteria preferably include: i) HNR is larger than HRN threshold; ii) HNR is increasing; iii) There must have at least one HNR jump in N_HIT runs.
5. 3 FFT norms around the howling frequency bin are interpolated.
6. Only howling sounds are removed. Both speech and music are kept intact.

In preferred embodiments of this invention, the following unique parameter values and functions and structures have been implemented but the invention is not limited to the use of these values. One knowledgeable in the arts and familiar with the concepts provided by this invention could substitute other values without undue experimentation:

1. N_FFT point FFT. N_FFT=1024 in preferred embodiments of this invention
2. Overlap FFT. 75% overlap FFT in preferred embodiments of this invention
3. One FFT taken for every new N_SAMPLE samples or hop size is N_SAMPLE. In preferred embodiments of this invention, N_SAMPLE=N_FFT/4 (256) or 16 ms for the sampling rate of 16 kHz
4. Squared Hanning window
5. Magnitude or norm of FFT bins accumulated for N_FFT_FRAME frames. In preferred embodiments of this invention, N_FFT_FRAME={3, 6, . . . , 15}
6. Magnitude or norm of FFT bins averaged for every N_AVERAGE_FRAME frames. In preferred embodiments of this invention, N_AVERAGE_FRAME={3, 6, . . . , 15}
7. Howling frequency detected for N_HIT_FRAME frames. N_HIT_FRAME is so chosen that the howling detection time is the multiples (or close to the multiples) of the system delay. In preferred embodiments of this invention, N_HIT_FRAME=3
8. FFT magnitude buffers zeroed for every N_RESET_FRAME frames. In embodiments of this invention, N_RESET_FRAME=15
9. FFT bin I_MAX corresponding to the maximum FFT magnitude chosen to be howling candidate FFT bin
10. +/−FFT_HOWLING_DELTA FFT bins around I_MAX are also chosen to howling candidate FFT bins. In preferred embodiments of this invention, FFT_HOWLING_DELTA=3
11. Howling energy is calculated in the FFT bins spanned +/−NUM_HOWLING_POW_BIN bins around I_MAX. In preferred embodiments of this invention, NUM_HOWLING_POW_BIN=5
12. Howling power is calculated by the howling energy divided by (NUM_HOWLING_POW_BIN*2+1)
13. Noise floor energy is calculated by the total energy minus the howling energy.
14. Noise floor power is calculated by noise energy divided by (N_FFT/2−NUM_HOWLING_POW_BIN*2−1)
15. Noise floor power is smoothed by a first order smoother. In embodiments of this invention, the smoothing factor ALPHA_NOISE_FLOOR=0.01
16. Howling detected is based on howling to noise ratio (HNR), which is defined by howling power divided by smoothed noise floor.
17. HNR is smoothed by first order smoother. In embodiments of this invention, the smoothing factor ALPHA_HNR=0.3
18. Howling detection criteria: 1) Smoothed HNR is larger than HNR_THRD. In preferred embodiments of this invention, HNR_THRD=30; 2) Smoothed HNR is increasing for N_HIT runs. In preferred embodiments of this invention, N_HIT=5; 3) In N_HIT runs, at least there is one smoothed HNR jump that is greater than HNR_JUMP_THRD. In preferred embodiments of this invention, HNR_JUMP_THRD=1.2
19. HNR_THRD is adjusted in the low FFT bins, from DC to INDEX_HNR_THRD_ADJ. In preferred embodiments of this invention, INDEX_HNR_THRD_ADJ=64
20. HNR_THRD is adjusted by exponential decreasing curve.
21. Non-flat microphone frequency response is compensated by EQ filter. Alternatively, FFT magnitudes in the low frequency bands are compensated by an exponential decreasing curve.
22. Notch filter with the howling frequency as center frequency is designed on-the-fly.
23. Notch filter designed only by the howling frequency and octave bandwidth BW. In preferred embodiments of this invention, one fifth octave of frequency is taken as BW.
24. N_FILTER notch filters allocated, and last N_RECYCLE_FILTER notch filters recycled. In preferred embodiments of this invention, N_FILTER=12 and N_RECYCLE_FILTER=3

Howling can be produced in any audio systems having the microphone and speaker positioned in the same acoustic enclosure. Howling is extremely annoying. This acoustic feedback cancellation or howling control technology has been successfully implemented in the Creative Labs speaker products. This technology can be used in any audio systems prone to howling generation, or this technology can also be used in any audio products wherein the microphone and speaker are included in the same device or same acoustic environment.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An acoustic feedback canceling system comprising: a FFT configured to convert an input audio signal to the frequency domain; detecting and estimating howling frequency candidates bins, the detecting based on a howling to noise ratio (HNR) and wherein the howling frequency is calculated based on determining a peak magnitude for an FFT bin and the FFT magnitudes for the FFT bins immediately lower in frequency and higher in frequency relative to the peak magnitude FFT bin and using these bins as candidates bins for the estimated howling frequency, wherein the howling frequency is refined from the candidate bin values by calculating an FFT bin delta value that is used to adjust the frequency corresponding to the peak magnitude FFT bin; providing filter coefficients for the adaptive design for removal of the estimated howling frequency; and a filter placed in line with the audio input signal to remove the estimated howling frequency.

2. The feedback canceling system of claim 1 wherein the howling to noise ratio (HNR) comprises a ratio between the power of a candidate frequency and the power of a noise floor.

3. The feedback canceling system of claim 2 wherein both the noise floor and the HNR are smoothed by a first order smoother.

4. The feedback canceling system of claim 1 wherein FFT norms are accumulated and averaged.

5. The feedback canceling system of claim 2 wherein the howling detection criteria is at least one of a) the HNR is larger than the HNR threshold; HNR is increasing; and there must be at least one HNR jump in N_HIT runs meeting a threshold criteria.

6. The feedback canceling module of claim 1 wherein the estimated howling frequency is based on a comparison of successive frames.

7. The feedback canceling system of claim 1 wherein the howling frequency estimation is based on a bin increment from a howling frequency candidate bin, the bin increment based on FFT norms around an FFT bin determined to have the maximum power.

8. The acoustic feedback cancelling system of claim 1 wherein the FFT bin delta value is calculated in the log domain and calculating the FFT bin delta value comprises:
    creating a ratio of first and second values, wherein the first value comprises the difference of the log domain values of peak magnitudes of the FFT bins immediately lower and higher in frequency relative to the peak magnitude bin; and
    the second value comprises summing the log domain values of peak magnitudes of the FFT bins immediately lower and higher in frequency relative to the peak magnitude bin and subtracting twice the log domain value of the peak magnitude bin.

9. A method for suppressing unwanted howling sounds comprising:
    receiving microphone signals;
    converting the microphone signals to the frequency domain;
    detecting and estimating howling frequencies in the frequency domain based on a howling to noise ratio (HNR), wherein the howling frequency is calculated based on determining a peak magnitude FFT bin and the FFT magnitudes for the FFT bins immediately before and after the peak magnitude FFT bin and identifying these bins as candidate bins for the estimated howling frequency, wherein the howling frequency is refined from the candidate bin values by calculating an FFT bin delta value that is used to adjust the frequency corresponding to the peak magnitude FFT bin;
    adaptively designing a notch filter for the howling frequency; and
    removing the howling frequency from the input signal.

10. The method recited in claim 9 wherein the howling detection is based on a howling to noise ratio (HNR) which comprises a ratio between the power of a candidate frequency and the power of a noise floor.

11. The method recited in claim 10 wherein both the noise floor and the HNR are smoothed by a first order smoother.

12. The method recited in claim 11 wherein the howling detection criteria is at least one of a) the HNR is larger than the HNR threshold; HNR is increasing; and there must be at least one HNR jump in N_HIT runs meeting a threshold criteria.

13. The method recited in claim 12 wherein 3 FFT norms around the howling frequency bin are interpolated.

14. The method recited in claim 9 wherein FFT norms are accumulated and averaged.

15. The method as recited in claim 9 wherein the FFT bin delta value is calculated in the log domain and calculating the FFT bin delta value comprises:
    creating a ratio of first and second values, wherein the first value comprises the difference of the log domain values of peak magnitudes of the FFT bins immediately lower and higher in frequency relative to the peak magnitude bin; and
    the second value comprises summing the log domain values of peak magnitudes of the FFT bins immediately lower and higher in frequency relative to the peak magnitude bin and subtracting twice the log domain value of the peak magnitude bin.

16. An audio system with an integrated notch-filter based howling suppression system comprising: a microphone; a FFT configured to convert an input audio signal to the frequency domain; detecting and estimating howling frequency candidates bins, the detecting based on a howling to noise ratio (HNR) wherein a howling frequency is calculated based determining a peak magnitude FFT bin and the FFT magnitudes for the FFT bins immediately before and after the peak magnitude FFT bin and identifying these bins as candidate bins for the estimated howling frequency wherein the howling frequency is refined from the candidate bin values by calculating an FFT bin delta value that is used to adjust the frequency corresponding to the peak magnitude FFT bin; providing filter coefficients for the adaptive design for removal of the estimated howling frequency; and a bank of adjustable notch filters placed in line with the audio input signal to remove the estimated howling frequency.

17. The audio system as recited in claim 16, wherein the bank of adjustable notch filters include at least one IIR filter.

18. The audio system as recited in claim 16 wherein the howling detection is based on a howling to noise ratio (HNR) which comprises a ratio between the power of a candidate frequency and the power of a noise floor.

19. The audio system as recited in claim 16 wherein the FFT bin delta value is calculated in the log domain and calculating the FFT bin delta value comprises:
    creating a ratio of first and second values, wherein the first value comprises the difference of the log domain values of peak magnitudes of the FFT bins immediately lower and higher in frequency relative to the peak magnitude bin; and
    the second value comprises summing the log domain values of peak magnitudes of the FFT bins immediately lower and higher in frequency relative to the peak magnitude bin and subtracting twice the log domain value of the peak magnitude bin.

* * * * *